(12) United States Patent
Slutsky

(10) Patent No.: US 11,947,892 B1
(45) Date of Patent: Apr. 2, 2024

(54) PLAIN-TEXT ANALYSIS OF COMPLEX DOCUMENT FORMATS

(71) Applicant: CLAIMABLY LLC, Bloomfield Township, MI (US)

(72) Inventor: Isaac T. Slutsky, Bloomfield Township, MI (US)

(73) Assignee: CLAIMABLY LLC, Bloomfield Township, MI (US)

( * ) Notice: Subject to any disclaimer, the term of this patent is extended or adjusted under 35 U.S.C. 154(b) by 0 days.

(21) Appl. No.: 17/695,298

(22) Filed: Mar. 15, 2022

Related U.S. Application Data

(60) Provisional application No. 63/161,182, filed on Mar. 15, 2021.

(51) Int. Cl.
| | | |
|---|---|---|
| *G06F 40/103* | (2020.01) | |
| *G06F 9/48* | (2006.01) | |
| *G06F 40/143* | (2020.01) | |
| *G06F 40/197* | (2020.01) | |
| *G06F 40/279* | (2020.01) | |

(52) U.S. Cl.
CPC .......... *G06F 40/103* (2020.01); *G06F 9/4881* (2013.01); *G06F 40/143* (2020.01); *G06F 40/197* (2020.01); *G06F 40/279* (2020.01)

(58) Field of Classification Search
CPC .... G06F 40/103; G06F 9/4881; G06F 40/143; G06F 40/197; G06F 40/279
See application file for complete search history.

(56) References Cited

U.S. PATENT DOCUMENTS

| | | | | |
|---|---|---|---|---|
| 6,473,730 | B1* | 10/2002 | McKeown | G06F 40/30 707/E17.084 |
| 2007/0112841 | A1* | 5/2007 | Iwayama | G06F 16/93 707/999.102 |
| 2009/0150367 | A1* | 6/2009 | Melnik | G06F 16/86 |
| 2014/0067367 | A1* | 3/2014 | Simmons | G10L 15/22 704/8 |

* cited by examiner

*Primary Examiner* — Keith D Bloomquist
(74) *Attorney, Agent, or Firm* — Brooks Kushman P.C.

(57) ABSTRACT

A first document is stored in a first format having an ordered sequence of data elements including characters and embedded objects accessible by index location into the ordered sequence. The first document in the first format is converted into a second document in a second format having a second ordered sequence including a subset of the data elements of the first document including the characters but not the embedded objects, such that the index location into the ordered sequence of the characters differs between the first and second documents. The second document is analyzed in the second format as plain text to identify a string of the data elements of interest. A document location of the string of the data elements of interest is represented as a relative location into the second document. The relative location into the second document is mapped into the index location of the first document.

19 Claims, 7 Drawing Sheets

PLAIN-TEXT ANALYSIS OF COMPLEX DOCUMENT FORMATS

CROSS-REFERENCE TO RELATED APPLICATIONS

This application claims the benefit of U.S. provisional application Ser. No. 63/161,182 filed Mar. 15, 2021, the disclosure of which is hereby incorporated in its entirety by reference herein.

TECHNICAL FIELD

Aspects of the disclosure generally relate to the efficient plain-text analysis of complex document formats.

SUMMARY

In one or more illustrative examples, a system for document analysis is provided. The system includes a memory configured to store a first document in a first format, the first document having an ordered sequence of data elements, the data elements in the first format including characters and embedded objects, each data element being accessible by index location into the ordered sequence. The system further includes a processor programmed to convert the first document in the first format into a second document in a second format, the second document having a second ordered sequence including a subset of the data elements of the first document, the subset including the characters but not the embedded objects, such that the index location into the ordered sequence of the characters differs between the first document and the second document, analyze the second document in the second format as plain text, identify a string of the data elements of interest in the second document, represent a document location of the string of the data elements of interest as a relative location into the second document, and map the relative location into the second document into the index location of the first document.

In one or more illustrative examples, a method for document analysis is provided. A first document is stored in a first format having an ordered sequence of data elements, the data elements in the first format including characters and embedded objects, each data element being accessible by index location into the ordered sequence. The first document in the first format is converted into a second document in a second format, the second document having a second ordered sequence including a subset of the data elements of the first document, the subset including the characters but not the embedded objects, such that the index location into the ordered sequence of the characters differs between the first document and the second document. The second document is analyzed in the second format as plain text. A string of the data elements of interest is identified in the second document. A document location of the string of the data elements of interest is represented as a relative location into the second document. The relative location into the second document is mapped into the index location of the first document.

In one or more illustrative examples, a non-transitory medium includes instructions for document analysis that, when executed by a processor cause the processor to perform operations including to store a first document in a first format having an ordered sequence of data elements, the data elements in the first format including characters and embedded objects, each data element being accessible by index location into the ordered sequence; convert the first document in the first format into a second document in a second format, the second document having a second ordered sequence including a subset of the data elements of the first document, the subset including the characters but not the embedded objects, such that the index location into the ordered sequence of the characters differs between the first document and the second document; analyze the second document in the second format as plain text; identify a string of the data elements of interest in the second document; represent a document location of the string of the data elements of interest as a relative location into the second document; and map the relative location into the second document into the index location of the first document.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
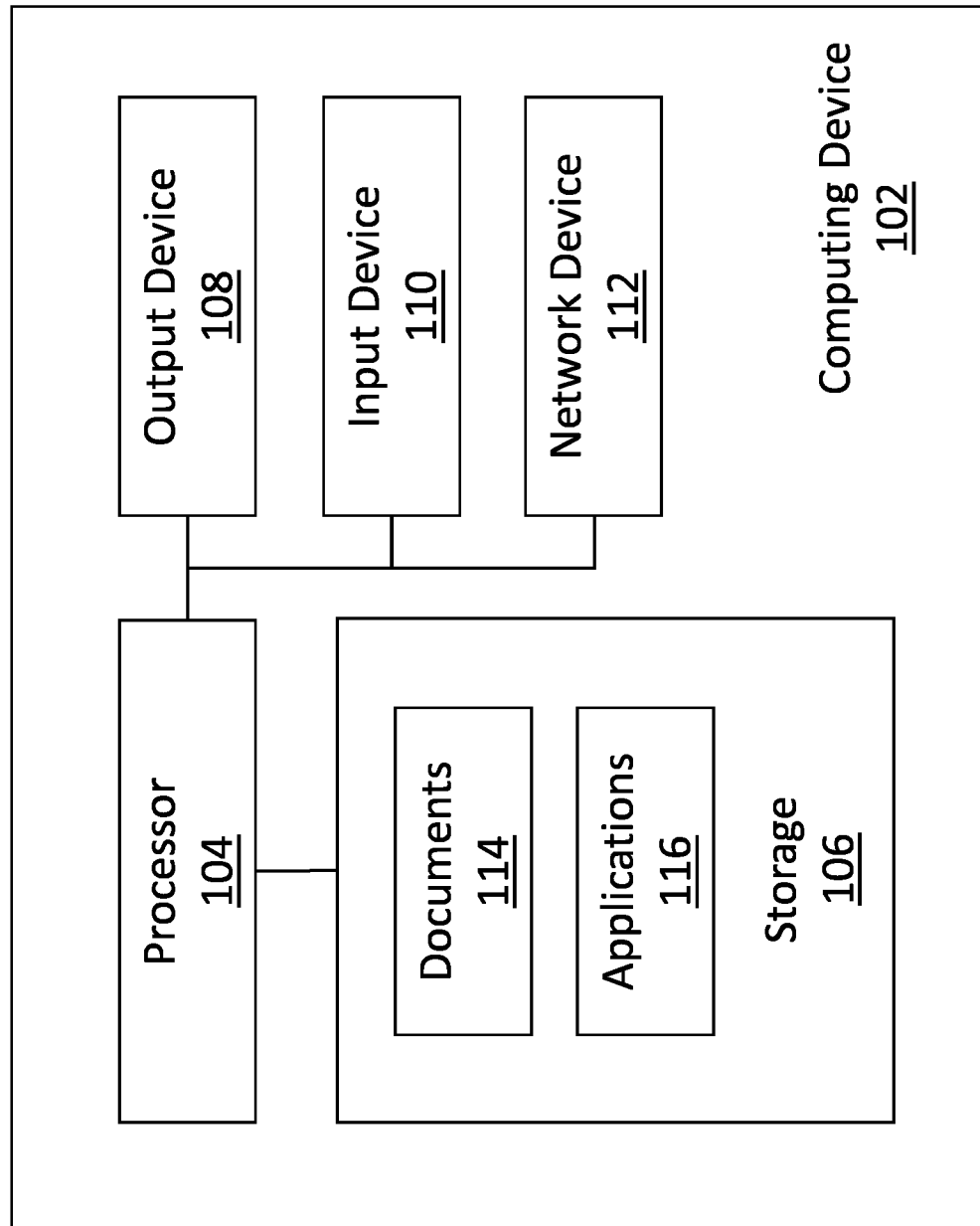
FIG. 1 illustrates a system including an example of a computing device for the efficient plain-text analysis of complex document formats.

As required, detailed embodiments are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

A container document refers to a document in which one or more documents are embedded within or linked to the container document. Embedded items may include plain text, structured text, images, mathematical equations, metafiles, shapes, lines, binaries, etc. Such documents may be stored as a sequence of bytes and/or characters, with the embedded elements or links located within the sequence at their respective locations within the container document. Elements in the container document, such as text, embedded objects, or linked objects, may be indexed by their byte or character position within the container document. This may allow the elements of the container document to be accessed by their indexed location.

Many software tools are available for locating textual elements within a plaintext document. In an example, regular expression libraries define search expression syntax for locating patterns in textual documents. In another example, text indexing tools may preprocess text documents, email messages, and other text documents to identify metadata elements in the documents for later search. However, these types of tools may be difficult to use on binary documents, container documents, or other file types that are beyond plain text. Moreover, these types of tools may be difficult to use on documents with embedded elements, as the embeds may not be processable by the tool. If the embeds are removed from the document to perform a search, then the indexes into the overall document may be offset due to the bytes used by the embedded elements.

A container document may be stored in a first format having an ordered sequence of data elements, where the data elements in the first format including characters and embedded objects, with each data element being accessible at its index location into the ordered sequence. To allow for the use of such search tools on such a document, the container document in the first format is converted into a plaintext document in a plaintext format, the plaintext document having a second ordered sequence including a subset of the data elements of the container document, the subset including the characters but not the embedded objects, such that the index location into the ordered sequence of the characters differs between the container document and the plaintext document. The plaintext document may then be analyzed in the second format as plain text. A string of the data elements of interest may be identified in the plaintext document. Having identified this location, the document location of the string of the data elements of interest may be mapped back into the index location into the container document.

This mapping may be performed, for example, by identifying the document location in the second document by a relative location. An example representation of the relative location may be a paragraph number of the paragraph including the string of the data elements and the occurrence number of the string of the data elements within the paragraph. Using this representation, the document location in the plaintext document may be mapped into a corresponding index location into the container document by finding, in a corresponding paragraph of the container document, the occurrence number of the identified string of the data elements. Further aspects of the disclosure are discussed in detail herein.

FIG. 1 illustrates a system 100 including an example of a computing device 102 for the efficient plain-text analysis of complex document formats. As shown, the computing device 102 may include a processor 104 that is operatively connected to a storage 106, an output device 108, an input device 110, and a network device 112. It should be noted that this is merely an example, and computing devices 102 with more, fewer, or different components may be used.

The processor 104 may include one or more integrated circuits that implement the functionality of a central processing unit (CPU) and/or graphics processing unit (GPU). In some examples, the processors 104 are a system on a chip (SoC) that integrates the functionality of the CPU and GPU. The SoC may optionally include other components such as, for example, the storage 106 and the network device 112 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

During operation, the processor 104 executes stored program instructions that are retrieved from the storage 106. The stored program instructions, accordingly, include software that controls the operation of the processors 104 to perform the operations described herein. The storage 106 may include both non-volatile memory and volatile memory devices. The non-volatile memory includes solid-state memories, such as NOT-AND (NAND) flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 108 of the computing device 102. The output device 108 may include a graphical or visual display device, such as an electronic display screen, projector, printer, or any other suitable device that reproduces a graphical display. As another example, the output device 108 may include an audio device, such as a loudspeaker or headphone. As yet a further example, the output device 108 may include a tactile device, such as a mechanically raiseable device that may, in an example, be configured to display braille or another physical output that may be touched to provide information to a user.

The input device 110 may include any of various devices that enable the computing device 102 to receive control input from users. Examples of suitable input devices that receive human interface inputs may include keyboards, mice, trackballs, touchscreens, voice input devices, graphics tablets, and the like.

The network devices 112 may each include any of various devices that enable the computing device 102 to send and/or receive data from external devices over networks. Examples of suitable network devices 112 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The storage 106 may be configured to maintain documents 114. These documents 114 may include, for example, plaintext documents 114, container documents 114, etc. In one example, the documents 114 may include documents 114 in the Office Open Extensible Markup Language (XML). In other examples, the documents 114 may include documents 114 in other formats such as hypertext markup language (HTML), JavaScript Object Notation (JSON), Portable Document Format (PDF), etc. The storage 106 may be further configured to maintain one or more applications 116. The applications 116 may include instructions that, when executed by the processor 104 cause the computing device 102 to perform operations as discussed in detail herein.

Figure 2:
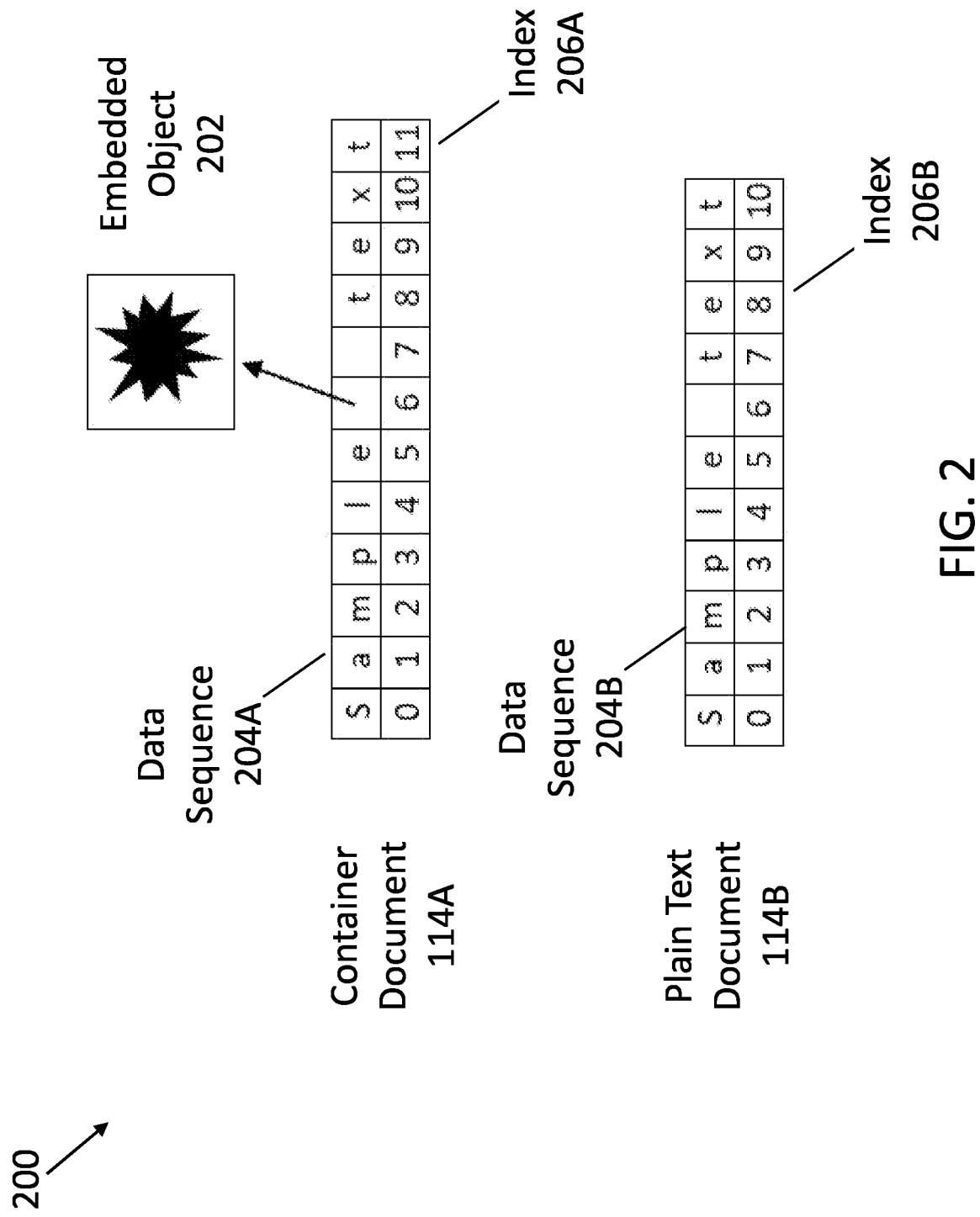
FIG. 2 illustrates an example of a container document including text and an embedded object as well as corresponding a plaintext document including the text but not the embedded object.

FIG. 2 illustrates an example 200 of a container document 114A including text and an embedded object 202, as well as corresponding a plaintext document 114B including the text but not the embedded object 202. The plaintext document 114B may be generated from the container document 114A by copying the text, but not other elements, from the container document 114A.

In the illustrated example 200, the container document 114A may be represented as a data sequence 204A. The data sequence 204A is shown as laid out continuously in memory. Each text character and embedded object 202 in the data sequence 204A may be referenced by an index 206A into the data sequence 204 in memory. For instance, the character S' may be referenced at index 206A location "0", the embedded object 202 may be referenced at index 206A location "6", and the character 'x' may be referenced at index 206A location "10".

Similarly, the plaintext document 114B is represented as a data sequence 204B. Each text character in the data sequence 204B may be referenced by its index 206B into the data sequence 204. Significantly, as there are no embedded objects 202 in the plaintext document 114B, some of the index 206B values into the plaintext document 114B differ from those of the index 206A values into the container document 114A. For instance, the character 'S' may still be referenced at index 206B location "0", but the character 'x' may instead be referenced at index 206A location "9", the embedded object 202 no longer taking an index position before the 'x' character.

Figure 3:
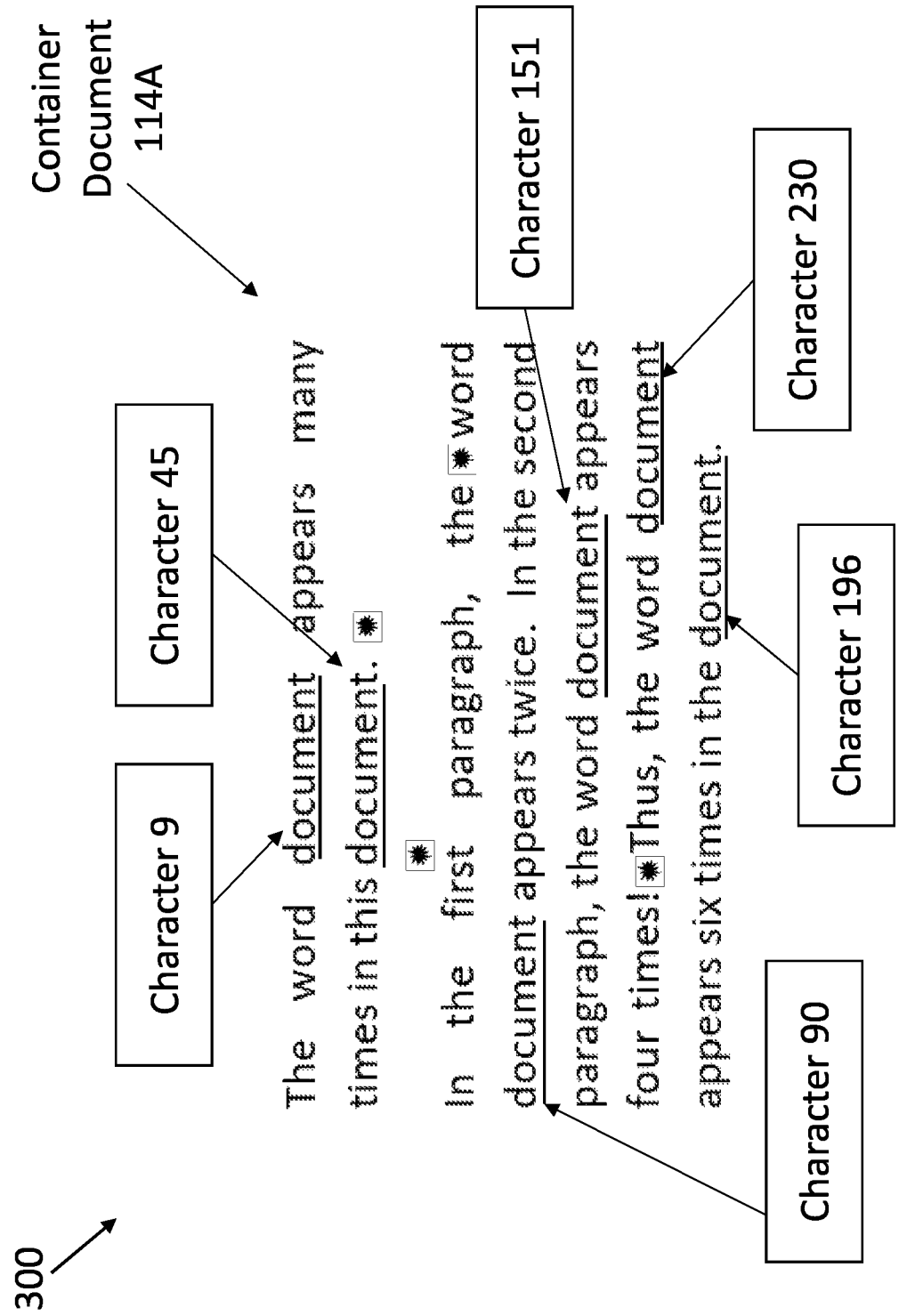
FIG. 3 illustrates an example of a container document having a term to be located.

FIG. 3 illustrates an example 300 of a container document 114A having a term to be located. As shown, the word "document" appears six times in the container document 114A, at index 206A offsets of 9, 45, 90, 151, 196, and 230. As the container document 114A may not be searchable with a plain text search tool, however, these locations may be difficult to locate. This may be because, for example, there is no fast and accurate interface to capture the locations or index length of the embeds in the container document 114A. Accordingly, the container document 114A may be converted into a plaintext document 114B instead. This conversion may involve copying the textual elements from the container document 114A into the plaintext document 114B, without also copying the embedded objects 202.

Figure 4:
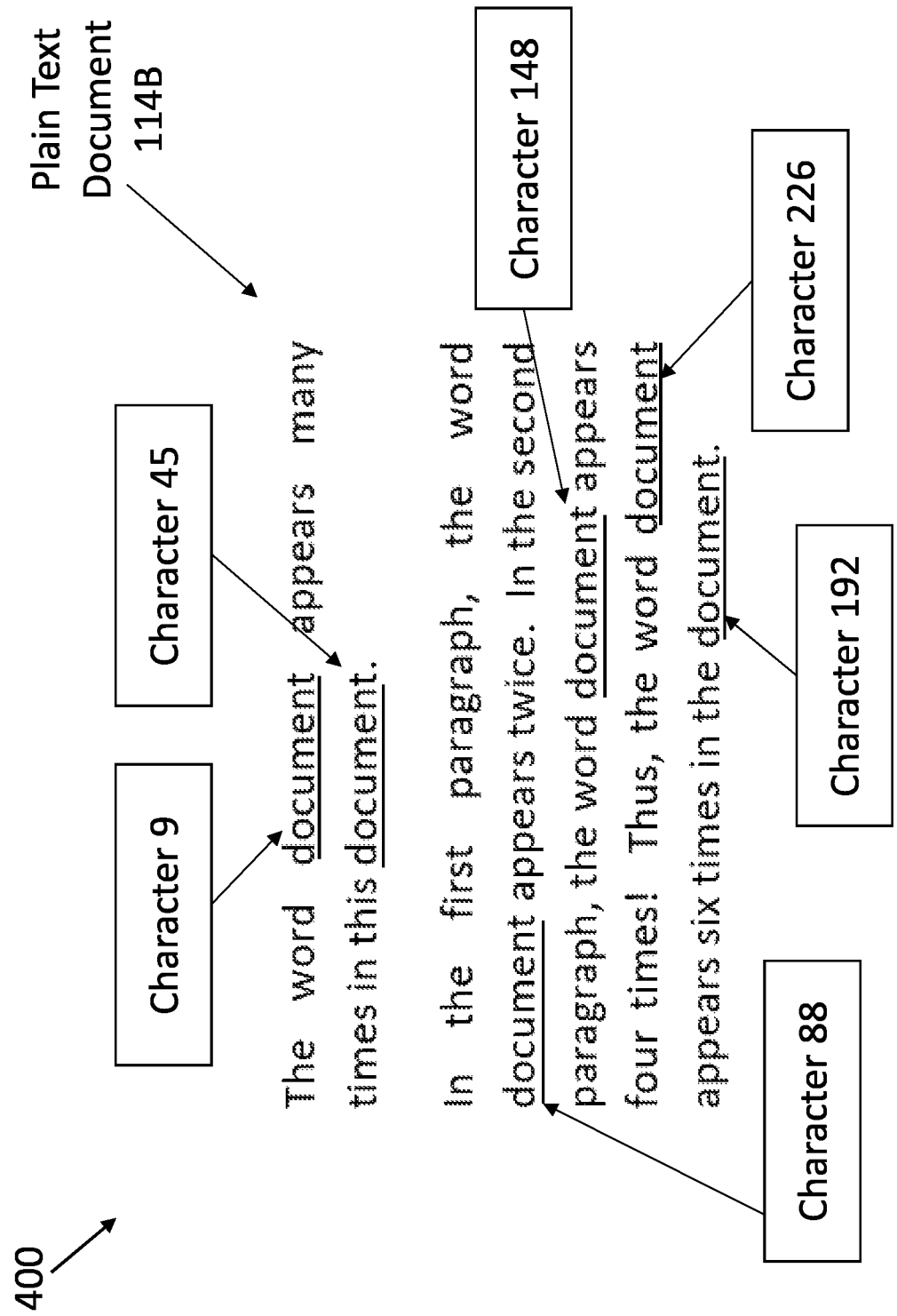
FIG. 4 illustrates an example of use of a text search tool on the plaintext document to locate the term.

FIG. 4 illustrates an example 400 of use of a text search tool on the plaintext document 114B to locate the term. As noted above, the textual search tool may not be operable on the container document 114A but may be operable on the plaintext document 114B. This may be the case, for example, due to limitations in the interface available for accessing the container document 114A. In an example, the application programming interface (API) used to access the data in the container document 114A may allow for access by index 206A or by range of indexes in the container document 11A, but not to the raw underlying memory data sequence 204A used by the container document 114A.

Referring more specifically to the example 400, the search may be performed for the word "document." This word appears six times in the plaintext document 114B, beginning at the index 206B offsets of 9, 45, 88, 148, 192, and 226. As the embedded objects 202 are not included in the plaintext document 114B, the index 206B offsets for the located elements into the plaintext document 114B are different form the index 206A offsets of the terms into the container document 114A. If the index 206B offsets into the plaintext document 114B are used as offsets into the container document 114A, incorrect data within the container document 114A may be retrieved. Accordingly, index 206B locations for elements located by the textual search tool in the plaintext document 114B may be unusable with the index 206A into the container document 114A.

(It should be noted that it may be possible to determine the offset length of the embedded objects 202 into the container document 114A and add those values to the index 206B values. This may allow for the adjustment of the index 206B values back into the index 206A values. However, such an approach involves the ability to identify the exact locations of the embedded objects 202 within the container document 114A, as well to identify the offset lengths (which may be more than one character unit) of each of the embedded objects 202 within the container document 114A. This information on the offset length of the embedded objects 202 into the container document 114A may be difficult to determine or may be opaque to the user or otherwise not be exposed from the API used to access the contents of the container document 114A.)

Figure 5:
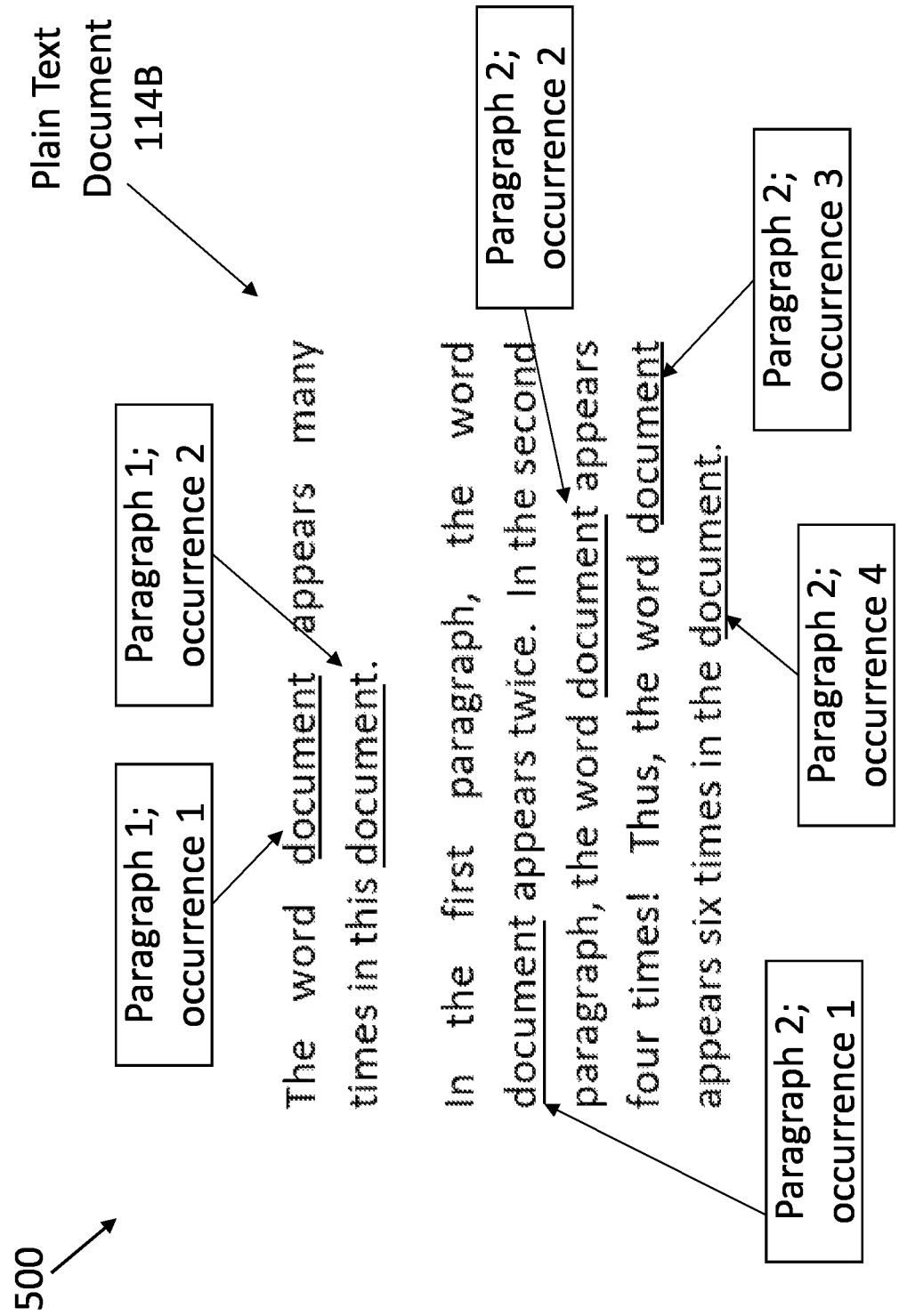
FIG. 5 illustrates an example of the identified terms in the plaintext document being referenced by relative location into the plaintext document.

FIG. 5 illustrates an example 500 of the identified terms in the plaintext document 114B being referenced by relative location into the plaintext document 114B. As shown, an example definition of the relative location may be based on a relatively more stable offset into the container document 114A, such as paragraph number (as opposed to character position). For instance, the relative locations may be specified by paragraph number and occurrence number within the paragraph. The index 206B offsets may be converted into the relative location format, for instance, by counting the number of occurrences of each term from the beginning of the paragraph to the located element. As shown, the six identified terms may instead be represented as "paragraph 1, occurrence 1," "paragraph 1, occurrence 2," "paragraph 2, occurrence 1," "paragraph 2, occurrence 2," "paragraph 2, occurrence 3," and "paragraph 2, occurrence 4."

Figure 6:
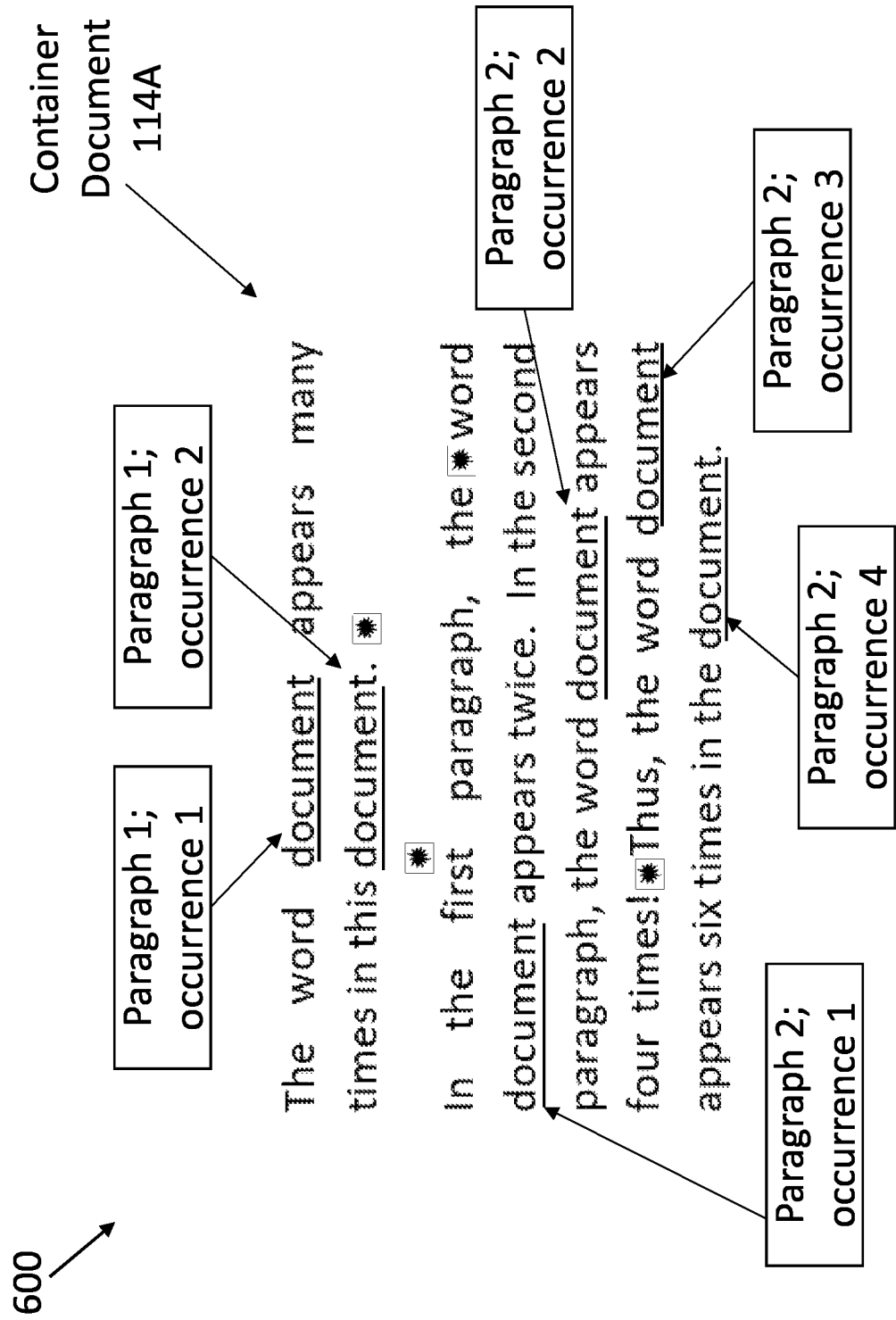
FIG. 6 illustrates an example of the relative locations in the container document.

FIG. 6 illustrates an example 600 of the relative locations in the container document 114A. Significantly, the same relative measures may be used for both the plaintext document 114B and the container document 114A. The index 206A locations into the container document 114A may then be computed for the relative locations by locating the corresponding paragraph number within the container document 114A and then searching, within that paragraph, for the number of that occurrence within the container document 114A.

Accordingly, search tools that are incompatible with the container document 114A may be utilized to provide complex textual search techniques, while avoiding issues with computation of the correct index 206A within the container document 114A. Moreover, the search operations that are represented as relative locations may be immune to minor changes in the container document 114A that can occur between when the search was performed and when a term is to be located in the container document 114A. For instance, additional text may have been inserted into the paragraph before a term, and/or text may have been deleted from the paragraph including the term. In either case, these edit operations would affect the index 206A location of the term within the paragraph. However, if these minor changes to the container document 114A do not affect the paragraph number or occurrence number of the term within the paragraph, the term may easily be located at the correct index 206A into the container document 114A.

Figure 7:
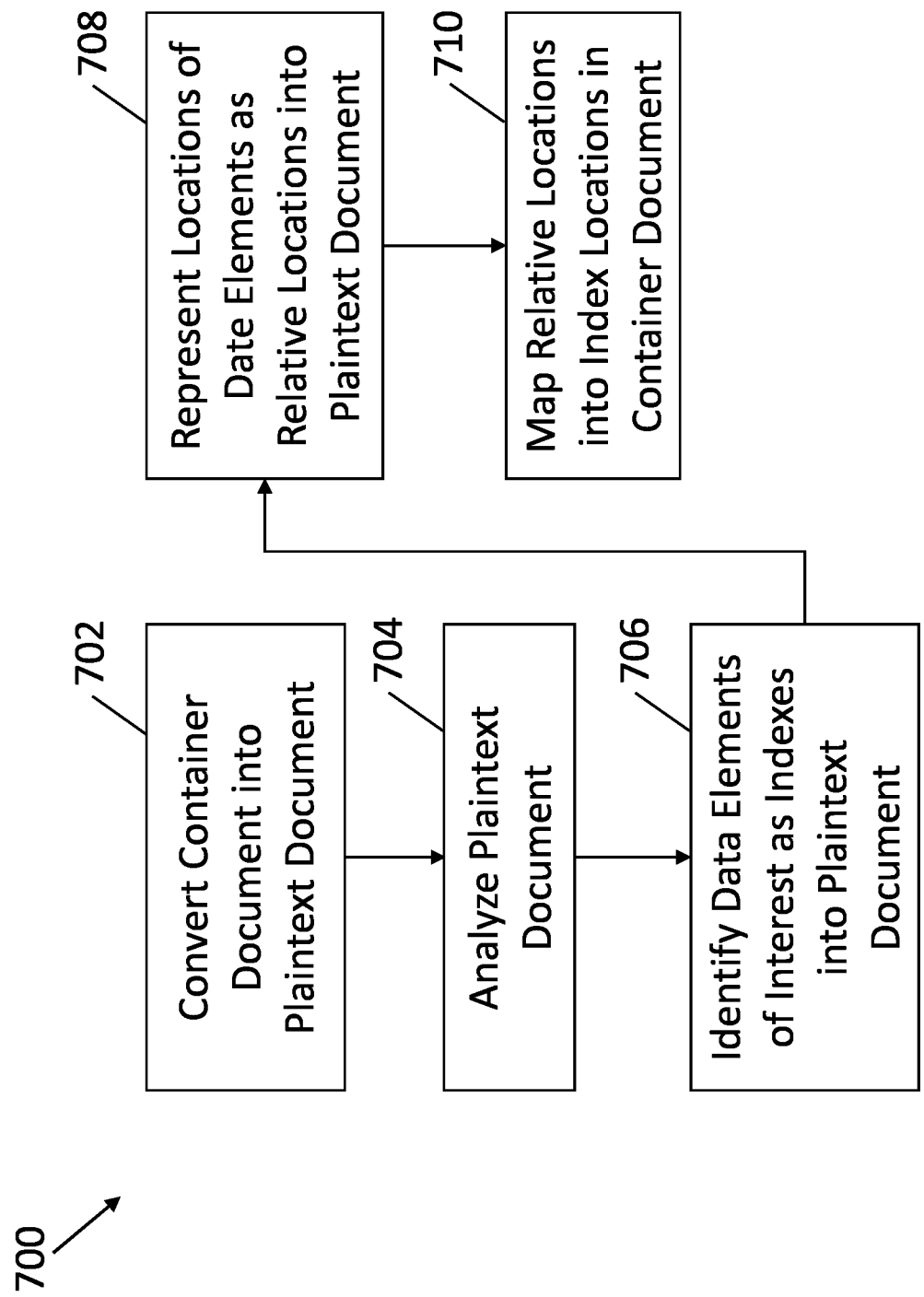
FIG. 7 illustrates an example process for the efficient plain-text analysis of complex document formats.

FIG. 7 illustrates an example process 700 for the efficient plain-text analysis of complex document formats. In an example, the process 700 may be performed by the processor 104 of the computing device 102 executing the applications 116 on documents 114 maintained to the storage 106.

At operation 702, the computing device 102 converts the container document 114A into the plaintext document 114B. In one example, the documents 114 may include documents 114 in the Office Open XML format. The computing device 102 may generate the plaintext document 114B from the container document 114A by copying the text from the container document 114A, but not other elements such as embedded objects 202 from the container document 114A.

At operation 704, the computing device 102 analyzes the plaintext document 114B. In an example, the computing device 102 executes one or more textual analysis operations on the plaintext document 114B. These may include, as some examples, regular expression searches of the plaintext document 114B or other textual searching or processing of the plaintext document 114B.

At operation 706, the computing device 102 identifies data elements of interest as indices 206B into the plaintext document 114B. In an example, these data elements may be search results of the analysis performed at operation 704.

At operation 708, the computing device 102 represents the locations of the data elements as relative locations into the plaintext document 114B. For instance, an example definition of the relative location may be based on a relatively more stable offset into the container document 114A, such as paragraph number (as opposed to character position). This relative locations may be specified by paragraph number and occurrence number within the paragraph, in an example. The index 206B offsets may be converted into the relative location format by counting the number of occurrences of each term from the beginning of the paragraph to the located element. In other examples, this occurrence number may be computed as a count from the end of the paragraph, as opposed to from the beginning of the paragraph. Other relative location measures may also be used. For instance, indexes may be computed from the beginning of sentences in another example. Or, indexes may be computed from any of a set of common English stop words, in another example.

At operation 710, the computing device 102 maps the relative locations into the plaintext document 114B into index 206A locations into the container document 114A. The index 206A locations into the container document 114A may then be computed for the relative locations by locating the corresponding paragraph number within the container document 114A and then searching, within that paragraph, for (as an example) the number of that occurrence within the container document 114A. Thus, search tools that are incompatible with the container document 114A may be utilized to provide complex textual search techniques, while avoiding issues with offset computation of the index 206A within the container document 114A. For example, using the mapped location, the string of the data elements of interest may be highlighted in a display of the first document. This may be done, e.g., using the opaque document 114 API as the correct offset is now known. After operation 710, the process 700 ends.

In sum, by converting the container document 114A into a plaintext document 114B, powerful tools for locating textual elements within a plaintext document 114B may be used on the container document 114A. Moreover, by conversion of the located indexes 206B into the plaintext document 114B into relative locations and then into indexes 206A into the container document 114A, the locations of elements found in the plaintext document 114B may be identified in the container document 114A. Such an approach may be especially useful for opaque document 114 APIs, such as the document interface available by the Microsoft Word® word processor, which allows for access to the document by index, but lacks advanced search facilities or available information with respect to how embedded objects 202 may affect the indexes into the document 114.

In general, the processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for document analysis, comprising:
a memory configured to store a first document in a first format, the first document having an ordered sequence of data elements, the data elements in the first format including characters and embedded objects, each data element being accessible by index location into the ordered sequence; and
a processor programmed to:
convert the first document in the first format into a second document in a second format, the second document having a second ordered sequence including a subset of the data elements of the first document, the subset including the characters but not the embedded objects, such that the index location into the ordered sequence of the characters differs between the first document and the second document,
analyze the second document in the second format as plain text,
identify a string of the data elements of interest in the second document, represent a document location of the string of the data elements of interest as a relative location into the second document, the relative location being specified by occurrence number of the string from an offset location in the second document, such that the relative location is mappable to the index location of the string in both the first document and the second document, and map the relative location into the second document into the index location of the first document by finding the occurrence number of the string from the offset location in the first document.

2. The system of claim 1, wherein the processor is further programmed to:

identify the relative location in the second document by paragraph number of a paragraph including the string of the data elements as the offset location and the occurrence number of the string of the data elements within the paragraph; and map the relative location in the second document into a corresponding index location of the first document by finding, in a corresponding paragraph of the first document including the characters of the paragraph of the second document, the occurrence number of the string of the data elements.

3. The system of claim 1, wherein the first format is Office Open Extensible Markup Language (XML).

4. The system of claim 1, wherein to analyze the second document in the second format includes to locate the string of the data elements in the second document using regular expression search.

5. The system of claim 1, wherein the processor is further programmed to highlight the string of the data elements of interest in a display of the first document.

6. The system of claim 1, wherein the processor is further programmed to execute a processing thread and a user interface thread such that:

in the processing thread, the processor is configured to analyze the second document in the second format to identify the string of the data elements of interest in the second document without blocking the user interface thread; and in the user interface thread, the processor is configured to highlight the string of the data elements of interest in a display of the first document.

7. The system of claim 1, wherein information on offset lengths of the embedded objects in the first document is not exposed from an application programming interface (API) used by the system to access the ordered sequence of data elements of the first document, while index location of the offset location into the first document is exposed by the API.

8. A method for document analysis, comprising:

storing a first document in a first format having an ordered sequence of data elements, the data elements in the first format including characters and embedded objects, each data element being accessible by index location into the ordered sequence;

converting the first document in the first format into a second document in a second format, the second document having a second ordered sequence including a subset of the data elements of the first document, the subset including the characters but not the embedded objects, such that the index location into the ordered sequence of the characters differs between the first document and the second document;

analyzing the second document in the second format as plain text;

identifying a string of the data elements of interest in the second document;

representing a document location of the string of the data elements of interest as a relative location into the second document, the relative location being specified by occurrence number of the string from an offset location in the second document, such that the relative location is mappable to the index location of the string in both the first document and the second document; and mapping the relative location into the second document into the index location of the first document by finding the occurrence number of the string from the offset location in the first document.

9. The method of claim 8, further comprising:

identifying the relative location in the second document by paragraph number of a paragraph including the string of the data elements as the offset location and the occurrence number of the string of the data elements within the paragraph; and mapping the relative location in the second document into a corresponding index location of the first document by finding, in a corresponding paragraph of the first document including the characters of the paragraph of the second document, the occurrence number of the string of the data elements.

10. The method of claim 8, wherein the first format is Office Open XML.

11. The method of claim 8, wherein to analyze the second document in the second format includes to locate the string of the data elements in the second document using regular expression search.

12. The method of claim 8, further comprising highlighting the string of the data elements of interest in a display of the first document.

13. The method of claim 8, further comprising:

executing a processing thread and a user interface thread such that:

in the processing thread, analyzing the second document in the second format to identify the string of the data elements of interest in the second document without blocking the user interface thread; and in the user interface thread, highlighting the string of the data elements of interest in a display of the first document.

14. A non-transitory medium comprising instructions for document analysis that, when executed by a processor cause the processor to perform operations including to:

store a first document in a first format having an ordered sequence of data elements, the data elements in the first format including characters and embedded objects, each data element being accessible by index location into the ordered sequence;

convert the first document in the first format into a second document in a second format, the second document having a second ordered sequence including a subset of the data elements of the first document, the subset including the characters but not the embedded objects, such that the index location into the ordered sequence of the characters differs between the first document and the second document;

analyze the second document in the second format as plain text;

identify a string of the data elements of interest in the second document;

represent a document location of the string of the data elements of interest as a relative location into the second document, the relative location being specified by occurrence number of the string from an offset location in the second document, such that the relative location is mappable to the index location of the string in both the first document and the second document; and map the relative location into the second document into the index location of the first document by finding the occurrence number of the string from the offset location in the first document.

15. The medium of claim 14, wherein the processor is further programmed to:

identify the relative location in the second document by paragraph number of a paragraph including the string of the data elements as the offset location and the occurrence number of the string of the data elements within the paragraph; and map the relative location in the second document into a corresponding index location of the first document by finding, in a corresponding paragraph of the first document including the characters of the paragraph of the second document, the occurrence number of the string of the data elements.

16. The medium of claim 14, wherein the first format is Office Open Extensible Markup Language (XML).

17. The medium of claim 14, wherein to analyze the second document in the second format includes to locate the string of the data elements in the second document using regular expression search.

18. The medium of claim 14, wherein the processor is further programmed to highlight the string of the data elements of interest in a display of the first document.

19. The medium of claim 14, wherein the processor is further programmed to execute a processing thread and a user interface thread such that:

in the processing thread, the processor is configured to analyze the second document in the second format to identify the string of the data elements of interest in the second document without blocking the user interface thread; and in the user interface thread, the processor is configured to highlight the string of the data elements of interest in a display of the first document.

\* \* \* \* \*